(12) United States Patent
Oikawa et al.

(10) Patent No.: US 8,482,747 B2
(45) Date of Patent: Jul. 9, 2013

(54) INFORMATION PROCESSING DEVICE FOR PRINTING IMAGES OF A WEBPAGE, AND RECORDING MEDIUM HAVING PROGRAM FOR PRINTING IMAGES OF A WEB PAGE

(75) Inventors: Takashi Oikawa, Toyohashi (JP); Shinichi Asai, Gamagoori (JP); Mie Kawabata, Toyokawa (JP); Tomokazu Kato, Toyokawa (JP); Hiroshi Iwamoto, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 504 days.

(21) Appl. No.: 12/791,394

(22) Filed: Jun. 1, 2010

(65) Prior Publication Data

US 2010/0309497 A1  Dec. 9, 2010

(30) Foreign Application Priority Data

Jun. 3, 2009  (JP) ................................. 2009-133773

(51) Int. Cl.
| | | |
|---|---|---|
| *G06F 15/00* | (2006.01) | |
| *G06F 3/12* | (2006.01) | |
| *G06K 1/00* | (2006.01) | |
| *G06K 15/00* | (2006.01) | |

(52) U.S. Cl.
   USPC ........................................ 358/1.13; 358/1.14

(58) Field of Classification Search
   None
   See application file for complete search history.

(56) References Cited

U.S. PATENT DOCUMENTS 7,746,491 B2    6/2010  Ikeda et al.
2003/0037253 A1*  2/2003  Blank et al. ................... 713/200

FOREIGN PATENT DOCUMENTS

| JP | 11-219276 | 8/1999 |
| JP | 11-312069 | 11/1999 |
| JP | 2005-049950 | 2/2005 |

OTHER PUBLICATIONS

Kiyomi Inoue, Website Building Challenge! (Round Nine), Nikkei Personal Computing, vol. 306, Nikkei Business Publications, Inc., Japan, Feb. 9, 1998, pp. 284-288, and its Verified English Translation.
Office Action (Notification of Reasons for Refusal) dated May 10, 2011, issued in the corresponding Japanese Patent Application No. 2009-133773, and an English Translation thereof.

* cited by examiner

Primary Examiner — Douglas Tran
(74) Attorney, Agent, or Firm — Buchanan Ingersoll & Rooney PC

(57) ABSTRACT

An information processing device prints a link source webpage and a link target webpage so that (i) it is easy to grasp, from a printout of these webpages, that these webpages are associated with each other, and (ii) the printout can be easily organized. MFP displays a webpage using a web browser, stores image data of the webpage currently displayed, and detects whether this webpage has been switched to another webpage upon a user operation (e.g., a click operation). Upon this page switch, MFP stores image data of the other webpage, which is now currently displayed. When a print instruction is issued, MFP enlarges/reduces images of the webpages previously and currently displayed so they can be printed on the same sheet in proper sizes, generates a print image showing the enlarged/reduced images of these webpages, and prints the generated print image.

8 Claims, 10 Drawing Sheets

FIG. 11

| First storage area | Second storage area | First original image | Second original image |
|---|---|---|---|
| pc01-s.bmp | menu01.bmp | pc01.jpg | menu01.html |
| pc02-s.bmp | kakaku.bmp | pc02.bmp | kakaku.html |
| . . . . . | . . . . . | . . . . . | . . . . . |

INFORMATION PROCESSING DEVICE FOR PRINTING IMAGES OF A WEBPAGE, AND RECORDING MEDIUM HAVING PROGRAM FOR PRINTING IMAGES OF A WEB PAGE

This application is based on an application No. 2009-133773 filed in Japan, the contents of which are hereby incorporated by reference.

BACKGROUND OF THE INVENTION (1) Field of the Invention

The present invention relates to an information processing device having a webpage browsing function, and in particular to control of printing of a plurality of webpages.

(2) Description of the Related Art

In recent years, information processing devices such as personal computers and multifunction peripherals (MFPs) are equipped with web browsers that enable webpage browsing. Many webpages are configured to have a hierarchical structure with use of hyperlinks. The following shopping website is a typical example of a website having the hierarchical structure. The shopping website includes a webpage that serves as a link source (hereinafter referred to as "a link source webpage"). The link source webpage displays, as a page material, a price list showing prices of products in one-to-one correspondence with thumbnail images of the products. Here, hyperlinks are embedded in the thumbnail images. Each thumbnail image is hyperlinked to another webpage that serves as a link target (hereinafter referred to as "a link target webpage"). Each link target webpage displays an image of the corresponding product that is larger in size than the thumbnail image thereof. A user connects to the shopping website using a web browser, and browses a page image of the link source webpage that displays the price list showing the prices of the products in one-to-one correspondence with the thumbnail images of the products. When the user clicks on the thumbnail image of one of the products he/she likes, he/she can browse the link target webpage displaying an enlarged image of this product, which is larger in size than the thumbnail image thereof.

At this time, when the user wants to print out both of (i) the enlarged image of this product and (ii) the price list showing the prices of the products in one-to-one correspondence with the thumbnail images of the products, the user needs to perform the following operations. First, the user needs to cause the web browser to display the link source webpage, and print the displayed link source webpage. Thereafter, the user needs to cause the web browser to display the link target webpage by clicking on one of the hyperlinks on the link source page, and print the displayed link target webpage. Having to follow these many operational procedures is troublesome for the user.

In view of the above problem, Patent Literature 1 (JP Patent Application No. H11-312069) discloses a technique to simplify print operations. An image forming device of Patent Literature 1 prestores therein user settings in relation to webpages that are configured to have a hierarchical structure with use of hyperlinks (e.g., whether webpages ranked at lower levels of the hierarchical structure should be printed, and if so, the hierarchical level(s) of webpages that should be printed). When the user issues an instruction to print a webpage, the image forming device of Patent Literature 1 not only prints a page image currently displayed on the web browser, but also acquires and prints one or more other webpages ranked at lower levels of the hierarchical structure that have been specified by the user settings. With the above structure, if the user issues a print instruction just once, he/she can obtain printouts of page images of the link targets ranked at the specified levels, in addition to a printout of a page image of the link source currently displayed.

Although the image forming device of Patent Literature 1 allows the user to obtain printouts of images pertaining to the link target webpages and an image pertaining to the link source webpage with a simple operation, it gives rise to the following problems: it is difficult to grasp that the images pertaining to the link target webpages are associated with the image pertaining to the link source webpage (i.e., that the link source webpage is hyperlinked to the link target webpages); and it is troublesome to organize the resultant printouts.

SUMMARY OF THE INVENTION

In view of the above problems, it is an object of the present invention to provide an information processing device that makes it easy for a user to grasp the associations between images of a plurality of webpages related to one another, and that allows printing the webpages in such a manner that the resultant printout can be easily organized.

To achieve the above object, one aspect of the present invention is an information processing device that acquires via a network a first webpage in which a plurality of links are embedded, generates from the acquired first webpage a panel image to be displayed on a display panel, and displays the generated panel image on the display panel, the information processing device comprising: a selection receiver operable to receive, from a user, a selection of one of the links embedded in the first webpage whose panel image is being displayed; an acquirer operable, when the selection has been received, to (i) navigate from the first webpage to a second webpage corresponding to the one of the links, and (ii) acquire a link target image corresponding to the second webpage; a print instruction receiver operable to receive a print instruction from the user; and a print controller operable, when the print instruction has been received, to (i) generate a print image in which both the panel image and the link target image are arranged, and (ii) perform control to print the generated print image.

BRIEF DESCRIPTION OF THE DRAWINGS

This and the other objects, advantages and features of the invention will become apparent from the following description thereof taken in conjunction with the accompanying drawings which illustrate a specific embodiment of the invention.

In the drawings:

FIG. 11 shows an example of a database; and

DESCRIPTION OF THE PREFERRED EMBODIMENT

The following describes a preferred embodiment of the present invention with reference to the accompanying drawings.

1. Structure

Figure 1:
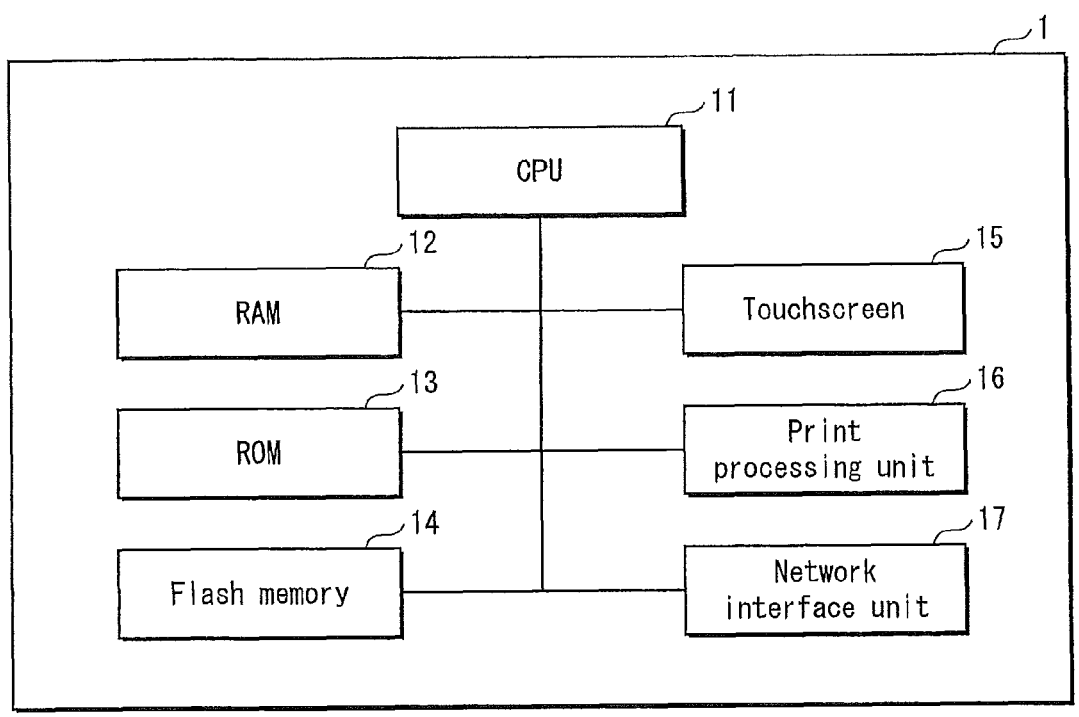
FIG. 1 is a block diagram showing the structure of a multifunction peripheral (MFP)

FIG. 1 is a block diagram showing the structure of a multifunction peripheral (MFP) 1 pertaining to the preferred embodiment of the present invention, the MFP 1 being one example of an information processing device.

As shown in FIG. 1, the MFP 1 is composed of a central processing unit (CPU) 11, a random-access memory (RAM) 12, a read-only memory (ROM) 13, flash memory 14, a touchscreen 15, a print processing unit 16, and a network interface unit 17.

The CPU 11 is a processor that reads programs stored in the ROM 13 into the RAM 12, and executes the read programs. The CPU 11 controls (i) an entirety of the MFP 1, (ii) generation of a graphical user interface (GUI) to be displayed on the touchscreen 15, and (iii) display of the GUI.

An operating system (OS), a web browser program, etc. are stored in the ROM 13 as programs. A web browser includes a rendering engine that performs image processing such as generating an image to be displayed on the touchscreen 15, enlarging/reducing the image in size, and extracting a part of the image. The web browser (i) communicates with a web server via the network interface unit 17, (ii) receives from the web server a webpage containing hypertext, an image associated with the hypertext by way of an image tag or the like (one example of a material to be displayed), and a price list, (iii) interprets the received webpage, (iv) causes the rendering engine to generate a page image of the received webpage, and (v) causes the touchscreen 15 to display the generated page image. For simplicity, any operation relating to operations of the programs may be described below as being performed by the programs. For example, the statement "the web browser displays a page image of a webpage on the touchscreen 15" actually means "the CPU 11 executes a web browser program, and while being operated, the web browser program acquires the webpage, generates the page image and causes the touchscreen 15 to display the generated page image".

Figure 2:
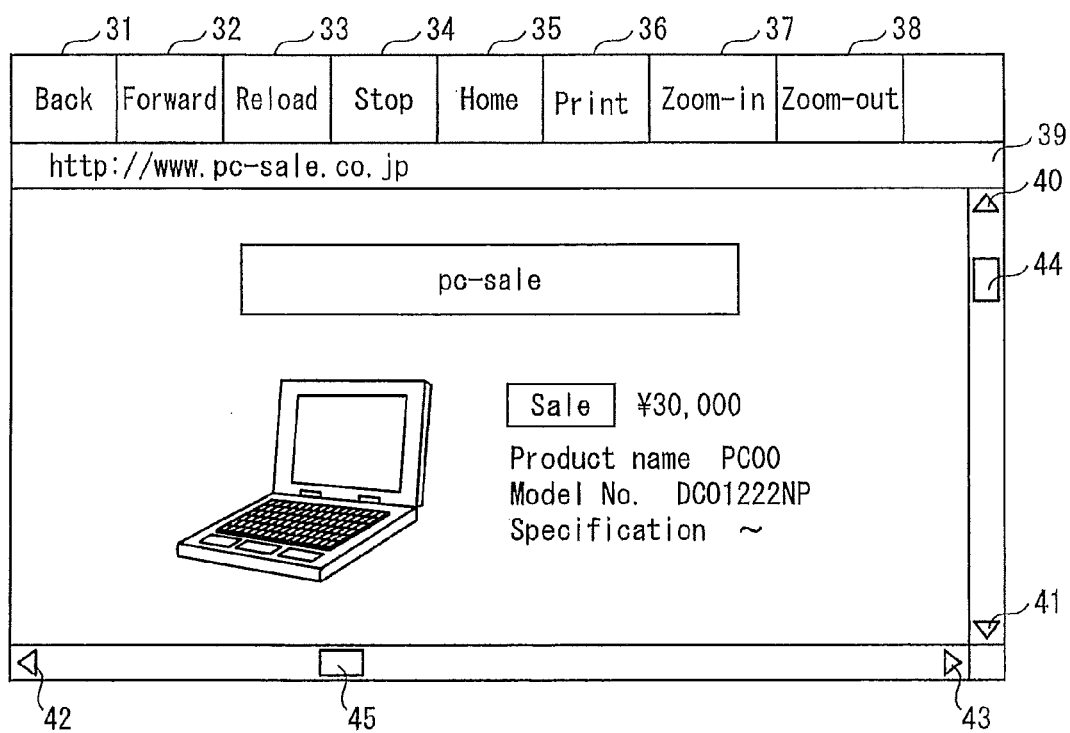
FIG. 2 shows an example of a web browser displayed on a touchscreen.

FIG. 2 shows an example of a web browser displayed on the touchscreen 15.

As shown in FIG. 2, the web browser is constituted from a back button 31, a forward button 32, a reload button 33, a stop button 34, a home button 35, a print button 36, a zoom-in button 37, a zoom-out button 38, a URL input section 39, a scroll-up button 40, a scroll-down button 41, a scroll-left button 42, a scroll-right button 43, a vertical scrollbar 44, and a horizontal scrollbar 45. Functions of these buttons will be described later.

The RAM 12 is volatile memory and stores therein data necessary for the CPU 11 to operate the programs, image data, etc.

The flash memory 14 is a nonvolatile storage device that stores therein image data downloaded via the web browser, etc. The flash memory 14 includes a first storage area and a second storage area, in each of which image data of a webpage is to be stored.

The touchscreen 15 is composed of a pressure-sensitive touchscreen unit and a liquid crystal display unit. When a user touches the touchscreen unit, the touchscreen unit acquires the coordinates of a position touched by the user, and notifies the web browser of the acquired coordinates. The web browser crosschecks the notified coordinates with an image currently displayed on the liquid crystal display unit, and judges what kind of user operation has been made. For example, when the notified coordinates correspond to a position where the back button 31 of the web browser is displayed, the web browser judges that the back button 31 has been touched and performs a predetermined operation corresponding to the back button 31.

The print processing unit 16 prints a page image, an image downloaded by the web browser, etc.

The network interface unit 17 is a communication interface that communicates with the web server and the like via the Internet.

The following is a supplementary description of the structure of the MFP 1 with a focus on the print processing unit 16.

Figure 12:
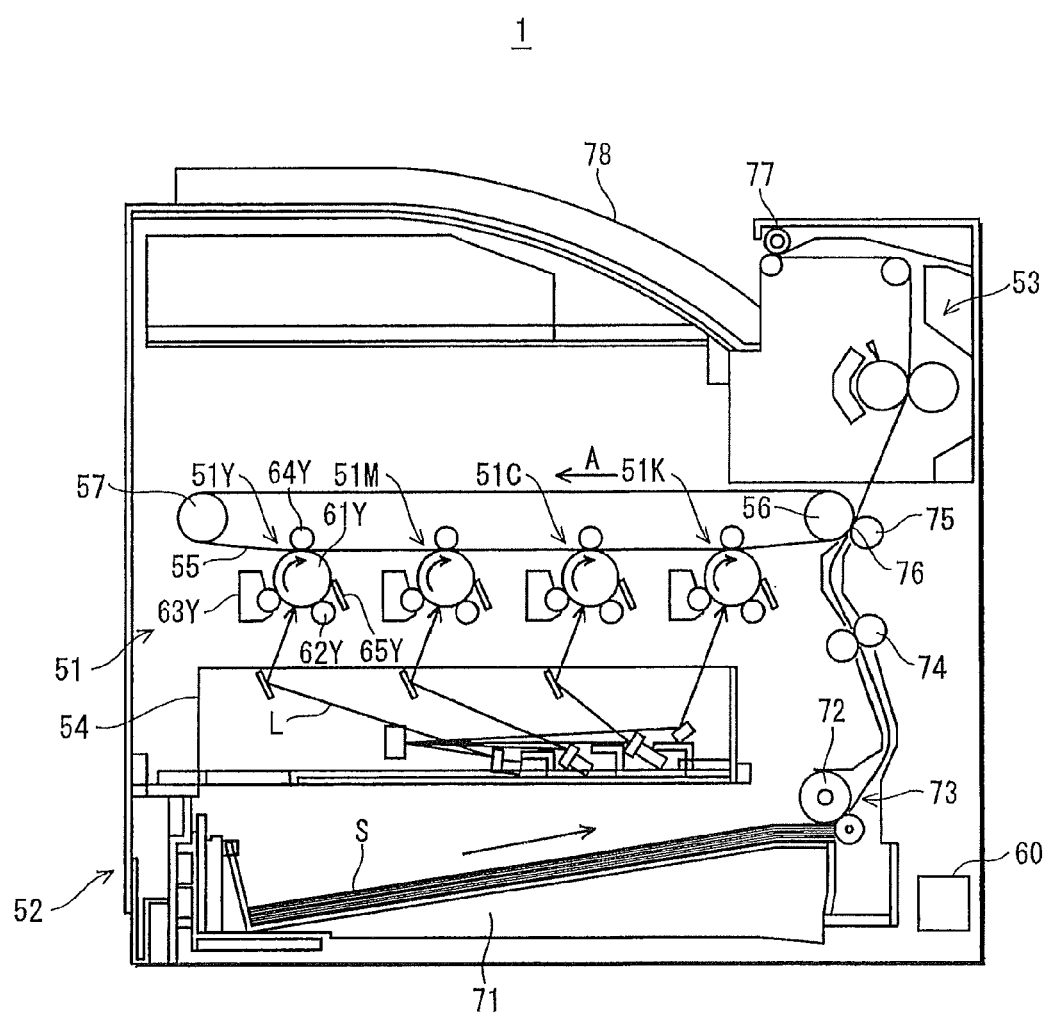
FIG. 12 is a schematic cross-sectional view showing an overall structure of MFP.

FIG. 12 is a schematic cross-sectional view showing an overall structure of the MFP 1.

The touchscreen 15 and the network interface unit 17 of FIG. 1 are not illustrated in FIG. 12. A control unit 60 corresponds to the CPU 11, the RAM 12, the ROM 13 and the flash memory 14 shown in FIG. 1, and other components correspond to the print processing unit 16.

When the control unit 60 receives a print instruction, the MFP 1 forms yellow, magenta, cyan and black toner images based on the print instruction, and thereafter forms a full-color image by transferring these toner images in turn such that they are overlaid upon one another. Below, the reproduction colors yellow, magenta, cyan and black are respectively denoted as Y, M, C and K, and the letters Y, M, C and K are respectively appended to the reference numbers of structural elements that relate to the reproduction colors yellow, magenta, cyan and black.

An image processing unit 51 is composed of image forming subunits 51Y, 51M, 51C and 51K that respectively correspond to yellow, magenta, cyan and black, an optical subunit 54, an intermediate transfer belt 55, and the like.

The image forming subunit 51Y includes a photosensitive drum 61Y, a charger 62Y, a developer 63Y, a primary transfer roller 64Y, a cleaner 65Y for cleaning the photosensitive drum 61Y, and the like. The charger 62Y, the developer 63Y, the primary transfer roller 64Y and the cleaner 65Y are all disposed surrounding the photosensitive drum 61Y. The image forming subunit 51Y forms a yellow toner image on the photosensitive drum 61Y. Other image forming subunits 51M, 51C and 51K are structured the same as the image forming subunit 51Y. The reference numbers pertaining to the image forming subunits 51M, 51C and 51K are omitted in FIG. 12.

The intermediate transfer belt 55 is an endless belt. The intermediate transfer belt 55 is suspended by a driving roller 56 and a driven roller 57 in a tensioned manner, and is driven to rotate in the direction of arrow A.

The optical subunit 54 includes light-emitting elements such as laser diodes. In accordance with a drive signal transmitted from the control unit 60, the optical subunit 54 emits laser light L for forming yellow, magenta, cyan and black images, and performs exposure scanning of the photosensitive drums 61Y, 61M, 61C and 61K.

As a result of performing this exposure scanning, electrostatic latent images are respectively formed on the photosensitive drums 61Y, 61M, 61C and 61K that have been charged by the chargers 62Y, 62M, 62C and 62K, then developed by the developers 63Y, 63M, 63C and 63K. The yellow, magenta, cyan and black toner images on the photosensitive drums 61Y, 61M, 61C and 61K are primary-transferred to the intermediate transfer belt 55 at different timings, so that they are located at the same position on the intermediate transfer belt 55 overlaid upon one another.

With the electrostatic force exerted by the primary transfer rollers 64Y, 64M, 64C and 64K, the toner images of the four colors are transferred to the intermediate transfer belt 55 in turn, thus forming a full-color toner image as a whole. The full-color toner image is conveyed further toward a secondary transfer position 76.

In the meantime, a feed unit 52 is composed of: a feed cassette 71 that contains recording sheets S; a pickup roller 72 that picks up the recording sheets S contained in the feed cassette 71 and guides them onto a conveyance path 73, one sheet at a time; a pair of timing rollers 74 for adjusting the timing to convey each of the picked up recording sheets S toward the secondary transfer position 76; and the like. In accordance with the timing of conveyance of the full-color toner image on the intermediate transfer belt 55, the feed unit 52 feeds each of the recording sheets S toward the secondary transfer position 76. With the aid of a secondary transfer roller 75, the full-color toner image on the intermediate transfer belt 55 is collectively secondary-transferred to each recording sheet S.

After passing the secondary transfer position 76, each recording sheet S is conveyed to a fixing unit 53. Once the full-color toner image (an unfixed image) on the recording sheet S has been fixed to the recording sheet S by heat and pressure in the fixing unit 53, the recording sheet S is discharged onto a discharge tray 78 via a pair of discharge rollers 77.

2. Operations

The following describes the operations of the MFP 1 structured in the above manner, by taking an example of a case where the MFP 1 accesses a website called "pc-sale" (URL: http://www.pc-sale.co.jp) and prints desired images.

Figure 3:
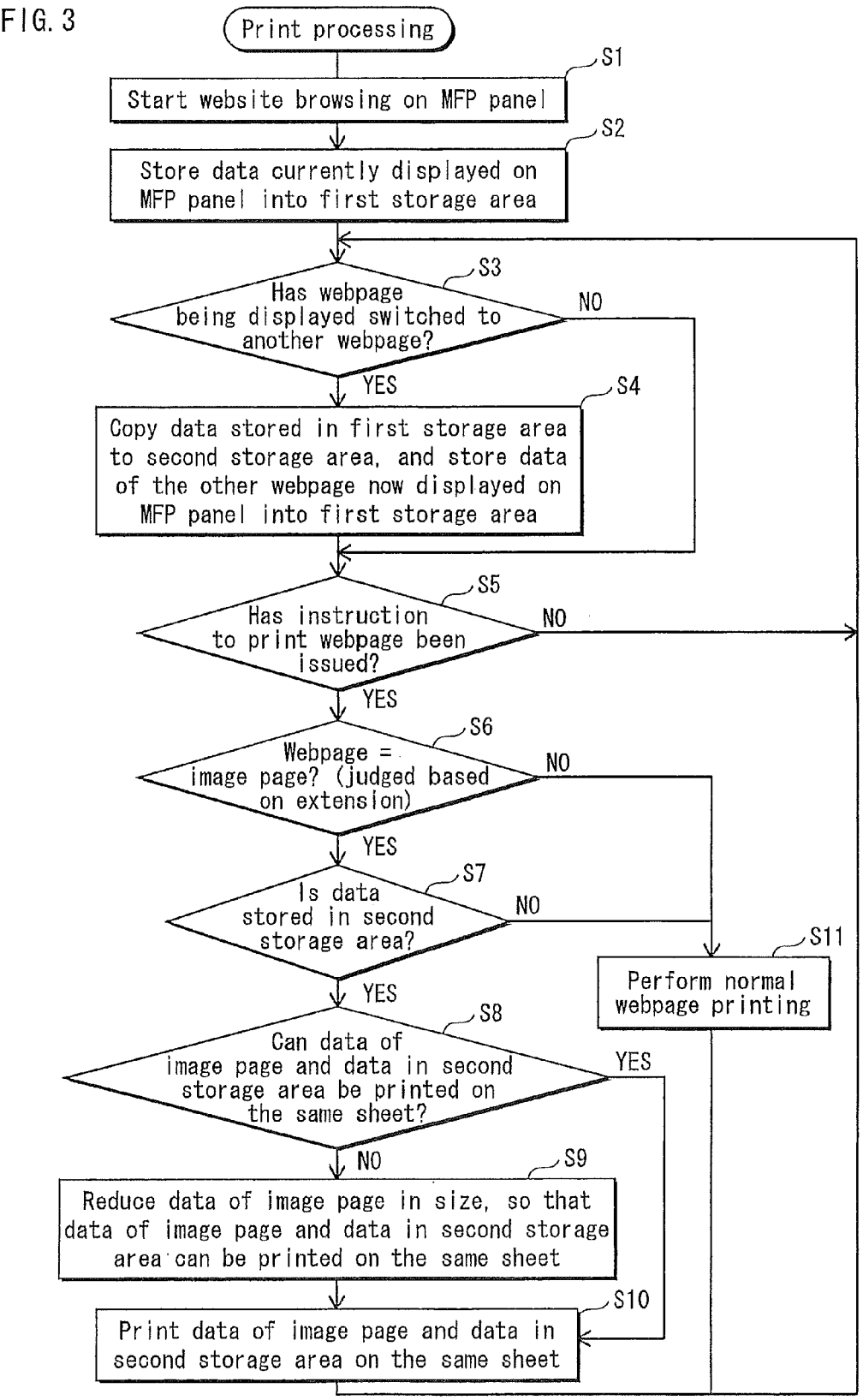
FIG. 3 is a flowchart of print processing performed by the MFP.

FIG. 3 is a flowchart of print processing performed by the MFP 1.

Figure 4:
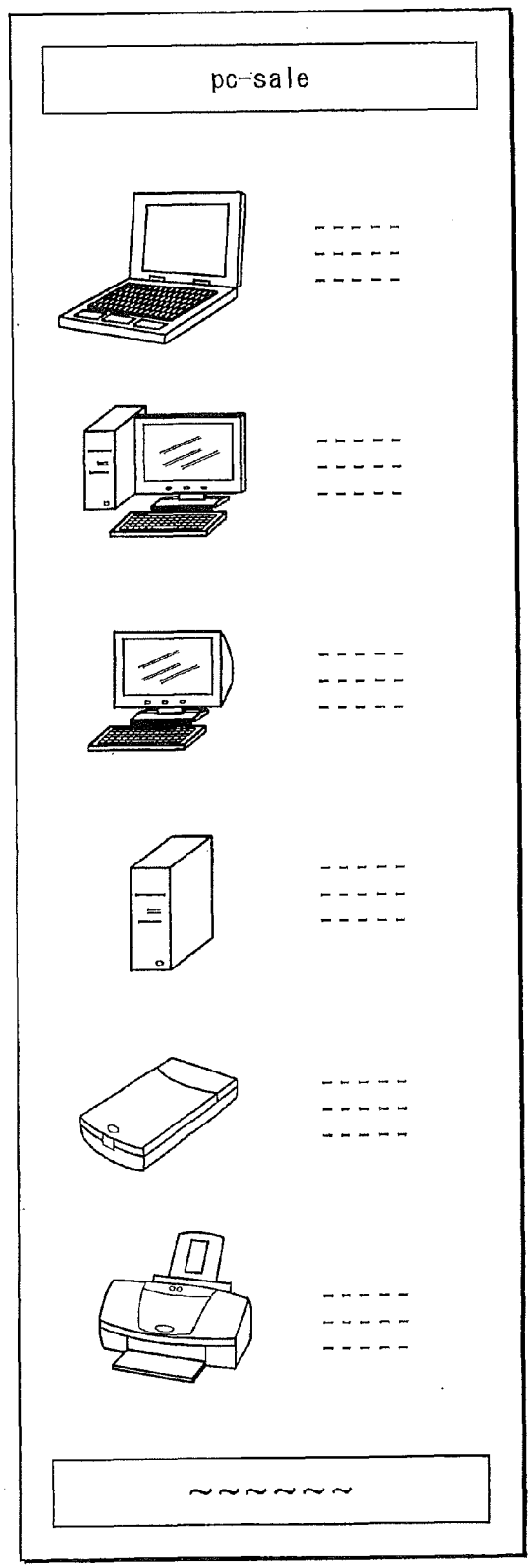
FIG. 4 shows a page image of an index page of a pc-sale website.

FIG. 4 shows a page image of an index page of the pc-sale website.

First, the user operates a display panel, i.e., the touchscreen 15, to input the URL of the pc-sale website (Step S1). At this time; the URL is input in the following manner. First, the CPU 11 causes the touchscreen 15 to display a software keyboard including alphabet keys and the like. Then, the user touches positions on the touchscreen 15 that respectively correspond to intended keys of the software keyboard.

The web browser in the MFP 1 accesses the pc-sale website indicated by the URL input by the user, and receives from a server of the pc-sale website a webpage of the pc-sale website, namely, hypertexts and the like of an index page of the pc-sale website. Then, the web browser interprets the received webpage, generates a page image in accordance with the interpretation, and causes the touchscreen 15 to display the generated page image. Note, because a display area of the touchscreen 15 is too small to display an entirety of the page image shown in FIG. 4, the touchscreen 15 displays a part of the page image (hereinafter referred to as "a panel image") in accordance with the display area of the touchscreen 15, as shown in FIG. 2.

When the user judges that the touchscreen 15 is not displaying a part of the page image that he/she wants to be view, he/she performs a user operation of touching one or more of the scroll-up button 40, the scroll-down button 41, the scroll-left button 42, the scroll-right button 43, etc. in order to have the desired part of the page image displayed on the touchscreen 15. Once the touchscreen 15 has notified the web browser that the user has touched any of the positions of the coordinates corresponding to the above scroll buttons, the web browser (i) generates, in accordance with the notification, an image that shows an upper/lower/left/right part of the page image currently displayed and that fits in the display area of the touchscreen 15, and (ii) causes the touchscreen 15 to display the generated image (hereinafter, this operation is said to "scroll the page image"). An amount by which the page image is scrolled varies depending on a type of the scroll button touched by the user, a length of a time period for which the user was touching the touchscreen 15, a number of times that the user touched the touchscreen 15 within a predetermined time period, etc.

When the panel image currently displayed on the touchscreen 15 is too small or too large, the user touches the zoom-in button 37 or the zoom-out button 38. When the touchscreen 15 notifies the web browser that the user has touched the zoom-in button 37 or the zoom-out button 38, the web browser (i) generates, from the webpage of the panel image currently displayed, an enlarged image or a reduced image of the panel image currently displayed, such that the enlarged image or the reduced image shares the same center as the panel image currently displayed, and (ii) displays the generated enlarged image or reduced image. By performing the above operations, the user can cause the touchscreen 15 to display a desired part of the page image of the webpage.

Each time the touchscreen 15 displays a page image, the web browser stores data of the page image into the first storage area of the flash memory 14 (Step S2). More specifically, the web browser stores bitmap data of a part of the page image that is currently displayed on the touchscreen 15 into the first storage area.

While the user is performing a series of operations to browse the page image, the web browser judges whether the user has instructed the web browser to switch from the page image currently displayed on the touchscreen 15 to another page image (Step S3). For instance, the web browser judges that the switch instruction has been issued when the user has touched a position (an image, a button, etc.) on the touchscreen 15 that corresponds to a hyperlink (e.g., http://www.pc-sale.co.jp/PC01.jpg) embedded in the panel image currently displayed on the touchscreen 15. However, the web browser judges in the negative in Step S3 (the NO branch of Step S3) in a case where the panel image currently displayed is to be switched to another panel image as a result of, for example, scrolling the panel image currently displayed, because in this case, said another panel image is still de-rived from the same webpage as the panel image currently displayed.

When judging that the switch instruction has been issued (the YES branch of Step S3), the web browser acquires a link target webpage indicated by the hyperlink, data of a photographic image, and the like from the pc-sale website. Thereafter, the web browser (i) generates a page image, a photographic image, etc. based on the acquired data, (ii) generates a panel image that shows the aforementioned images and fits in the display area of the touchscreen 15, and (iii) causes the touchscreen 15 to display the generated panel image. Also, each time the web browser judges that a webpage being displayed has been switched to another webpage (the YES branch of Step S3), the web browser first rewrites bitmap data stored in the second storage area of the flash memory 14 by replacing it with the bitmap data stored in the first storage area of the flash memory 14, then stores bitmap data of the panel image currently displayed (i.e., most recently generated) into the first storage area of the flash memory 14 (Step S4). This way, an image of a link source webpage is stored in the second storage area, whereas an image of a link target webpage is stored in the first storage area. When the web browser does not judge that a webpage being currently displayed has been switched to another webpage (the NO branch of Step S3), the web browser proceeds to the processing of Step S5.

The following is a supplementary explanation on Steps S3 and S4 with reference to FIGS. 5 to 8.

Figure 5:
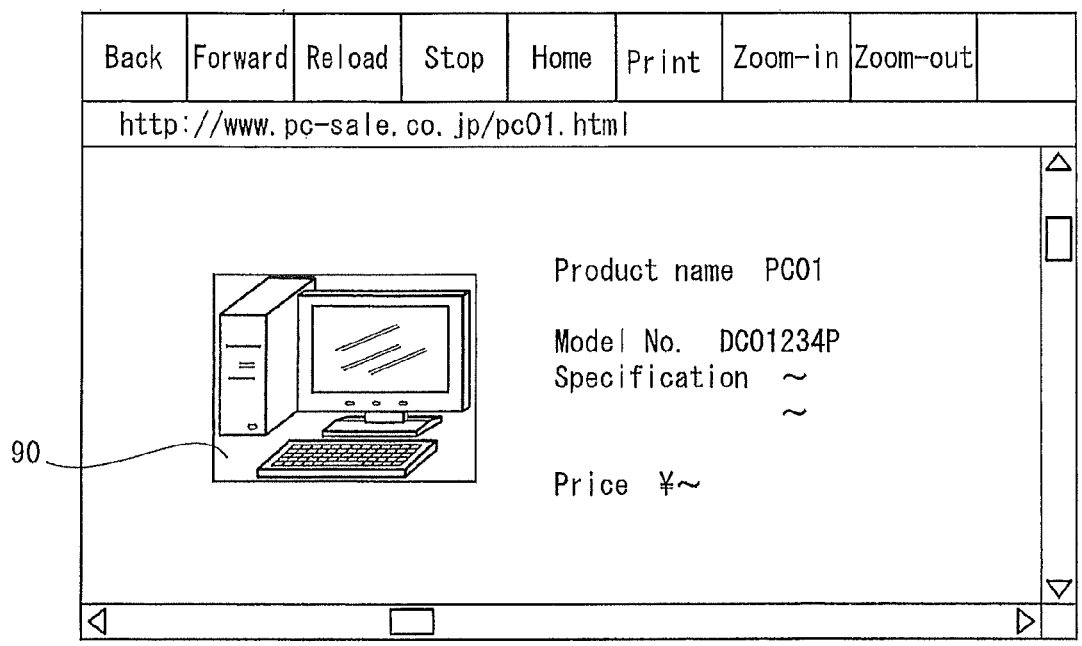
FIG. 5 shows a panel image being displayed on the touchscreen.
Figure 6:
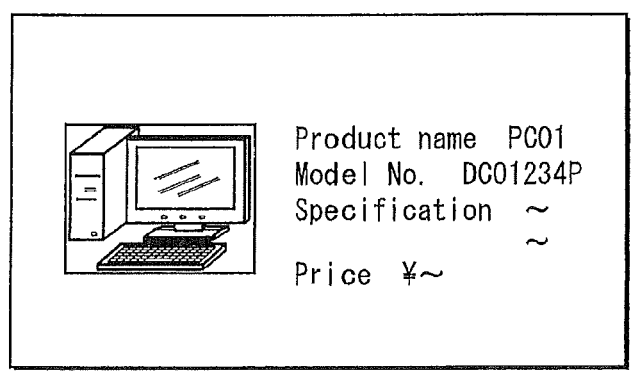
FIG. 6 shows an image of bitmap data stored in a first storage area.
Figure 7:
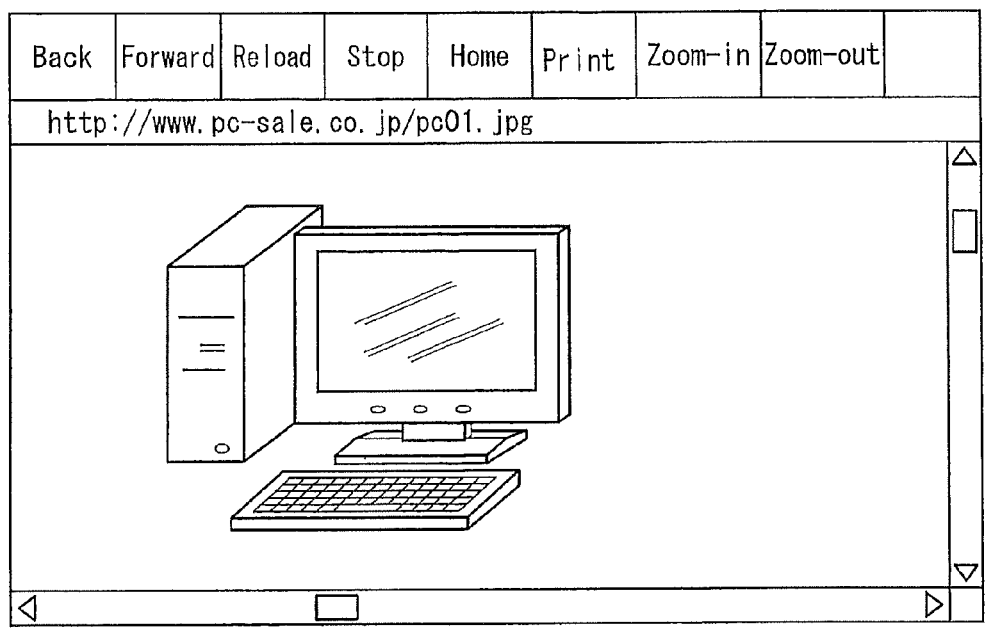
FIG. 7 shows an example of a panel image that has been generated to fit in a display area of the touchscreen.
Figure 8:
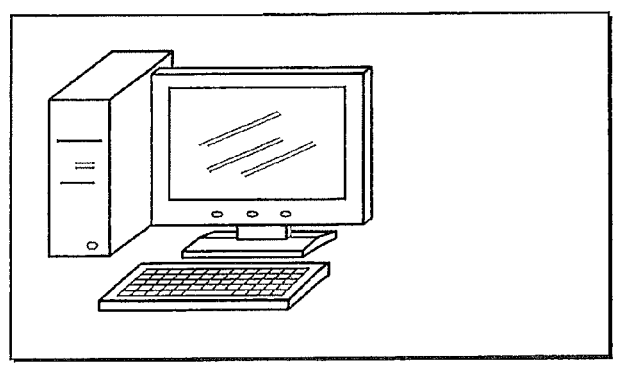
FIG. 8 shows an image of bitmap data stored in the first storage area.

Assume that the touchscreen 15 currently displays a panel image shown in FIG. 5. At this point, bitmap data of an image shown in FIG. 6 is stored in the first storage area. Also assume that a hyperlink that leads to the webpage http://www.pc-sale.co.jp/PC01.jpg is embedded in a partial image 90 shown in FIG. 5, which is a photograph of a personal computer. Operating under the above settings, when the user clicks on the partial image 90 of the panel image currently displayed, the web browser acquires image data indicated by the hyperlink (http://www.pc-sale.co.jp/PC01.jpg) from the pc-sale website. Then, the web browser generates an image based on the acquired image data, generates a panel image that fits in the display area of the touchscreen 15 from the generated image, and causes the touchscreen 15 to display the generated panel image as shown in FIG. 7. Furthermore, the web browser copies the bitmap data of the image shown in FIG. 6, which is stored in the first storage area, into the second storage area, and then stores the bitmap data shown in FIG. 8, which pertains to the panel image shown in FIG. 7, into the first storage area. This concludes the supplementary explanation. The description of the flowchart continues from here.

Figure 10:
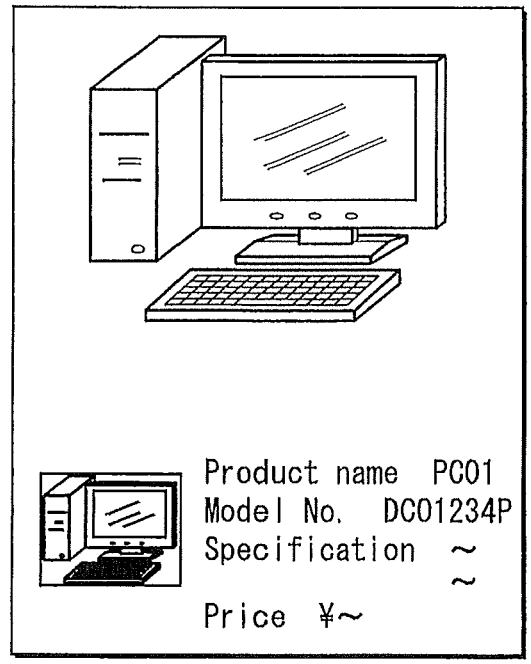
FIG. 10 shows a resultant printout.

The web browser judges whether the user has issued a print instruction by clicking on the print button (Step S5). When the print instruction has not been issued (the NO branch of Step S5), the web browser proceeds to the processing of Step S3. When the print instruction has been issued (the YES branch of Step S5), the web browser further judges whether the panel image currently displayed is a webpage showing an image (Step S6). This judgment is made based on whether the extension of data pertaining to an original image of the panel image currently displayed pertains to image data, i.e., whether it shows "jpg", "bmp", or the like (hereinafter referred to as "image data extension"). When judging that the extension associated with the panel image currently displayed is not the image data extension (the NO branch of Step S6), the web browser instructs the print processing unit 16 to print the panel image currently displayed (Step S11). When judging that the extension associated with the panel image currently displayed is the image data extension (the YES branch of Step S6), the web browser further judges whether data is stored in the second storage area (Step S7). When no data is stored in the second storage area (the NO branch of Step S7), the web browser proceeds to the processing of Step S11. When data is stored in the second storage area (the YES branch of Step S7), the web browser judges whether it is possible to print the panel image currently displayed and the image of the image data stored in the second storage area (hereinafter referred to as "a link source image") on the same sheet (Step S8). This judgment of Step S8 is made based on whether a size of a printing area that is required to print the panel image currently displayed and the link source image arranged one above the other is smaller than a size of a printable area of a sheet contained in a feed tray of the print processing unit 16. When the former size is smaller than the latter size, the web browser judges that the panel image currently displayed and the link source image can be printed on the same sheet. When the former size is larger than the latter size, the web browser judges that the panel image currently displayed and the link source image cannot be printed on the same sheet. When judging that the panel image currently displayed and the link source image can be printed on the same sheet in Step S8 (the YES branch of Step S8), the web browser instructs the print processing unit 16 to (i) generate a print image showing both of the panel image currently displayed and the link source image, in such a manner that they can be printed on the same sheet, and (ii) print the generated print image. The print processing unit 16 prints the generated print image in accordance with the instruction (Step S10). A resultant printout obtained from this print operation is shown in FIG. 10.

When judging that the panel image currently displayed and the link source image cannot be printed on the same sheet (the NO branch of Step S8), the web browser reduces the panel image currently displayed and/or the link source image in size, so that both of them can be printed on the same sheet (Step S9). At this time, the web browser reduces the panel image currently displayed and/or the link source image in size with the aspect ratio of each image unchanged, so as to maintain the proportion of each image. Once the panel image currently displayed and/or the link source image have been reduced in size, the web browser instructs the print processing unit 16 to print the panel image currently displayed and the link source image arranged one above the other. In accordance with this instruction from the web browser, the print processing unit 16 prints both of the panel image currently displayed and the link source image (Step S10).

The following is a supplementary explanation on processing of reducing an image in size with reference to FIGS. 9A to 9D.

Figure 9A:
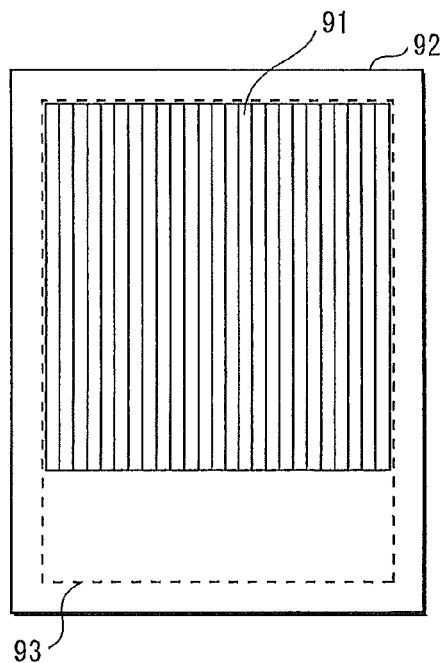
FIGS. 9A to 9D are diagrams for explaining image size reduction.
Figure 9B:
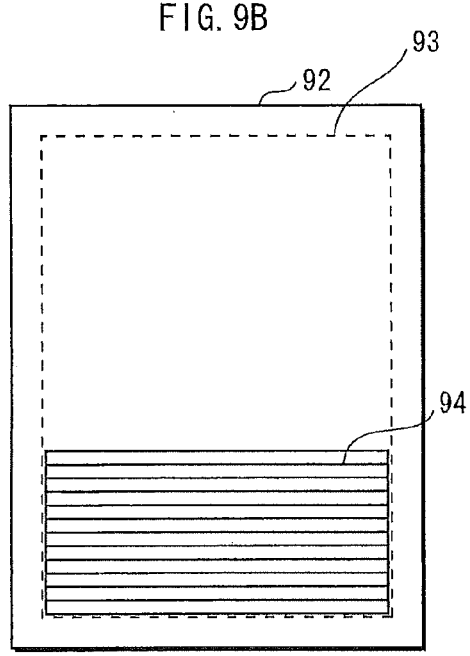
Figure 9C:
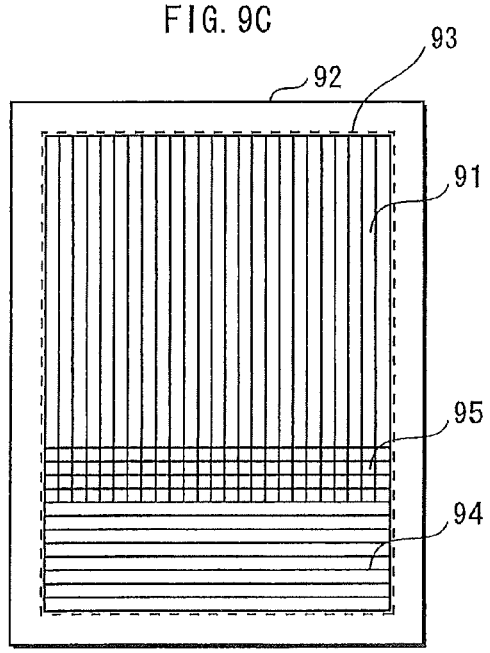

FIGS. 9A to 9C respectively show exemplary cases where a panel image 91 (FIG. 9A), a link source image 94 (FIG. 9B) and both of the panel image 91 and the link source image 94 (FIG. 9C) are printed within a printable area 93 of a sheet 92.

Figure 9D:
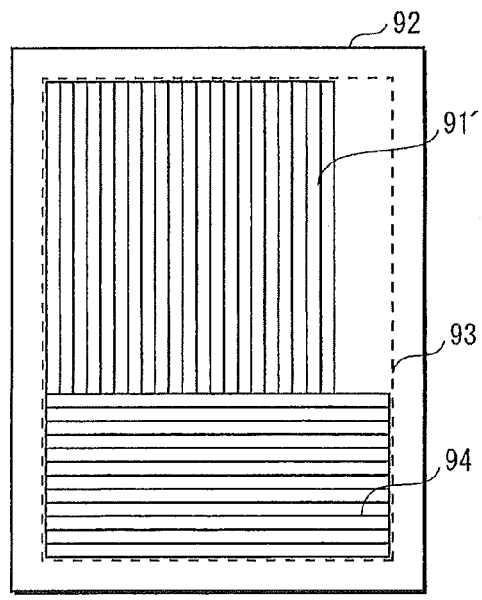

In the case of FIG. 9C, the panel image 91 and the link source image 94 overlap in a grid area 95 shown in FIG. 9C. Accordingly, in this case, the web browser judges that the panel image currently displayed and the link source image cannot be printed arranged one above the other in Step S8, and reduces the panel image 91 in size with its aspect ratio unchanged. Thereafter, the web browser prints the reduced panel image 91 and the link source image 94 arranged one above the other, as shown in FIG. 9D. A sum of the vertical length of the reduced panel image 91 and the vertical length of the link source image 94 is substantially the same as the vertical length of the printable area 93.

3. Modification Examples and Additional Notes

The present invention has been described based on the above embodiment. However, it goes without saying that the present invention is not limited to being implemented based on the above embodiment; various modifications may be applied to the present invention as long as they do not deviate from the object of the present invention.

(1) Although the above embodiment has described that the flash memory 14 includes the first storage area and the second storage area in which the link target image and the link source image are to be respectively stored, the flash memory 14 is not limited to this structure. For example, the flash memory 14 may not include the first storage area. In this case, when printing the link source image and the link target image, the link source image is read out from the second storage area while the link target image is derived from what is being displayed on the touchscreen 15. This structure can reduce the total size of data storage areas of the flash memory 14 by a size of the first storage area.

(2) It has been described in the above embodiment that the pieces of image data stored in the first storage area and the second storage area are both in bitmap format. However, the problem with bitmap images is that they become grainy when they are enlarged in size. In a case where an image size of a bitmap image is smaller than a size of an area of a sheet on which the bitmap image is to be printed, if the bitmap image is printed on the sheet after it is enlarged in size to fit in said area of the sheet, then the resultant printout shows a grainy image.

To address this problem, the present modification example introduces a technique to, when an image received from the web server is larger in size than the display area of the touchscreen 15, store the received image directly into the flash memory 14 in addition to storing the panel image into the first or second storage area.

When it is necessary to enlarge and print the image of the bitmap data stored in the first or second storage area, the web browser does not print the image of the bitmap data stored in the first or second storage area; instead, the web browser prints the above-mentioned image that has been directly stored into the flash memory 14, either as it is, or after optimizing it (e.g., enlarging or reducing it in size). This technique can prevent the resultant printout from showing a grainy image, i.e., print an elaborate image on the sheet.

In this case, the association between the image of the bitmap data stored in the first storage area and the image directly stored in the flash memory 14 is stored in the flash memory 14 or the like as a database.

FIG. 11 shows one example of such a database.

The database includes fields for the first storage area, the second storage area, a first original image and a second original image, in each of which a data name of corresponding stored data is written. In each row of the database, the data written in the field for the first storage area corresponds to the data written in the field for the first original image, and the data written in the field for the second storage area corresponds to the data written in the field for the second original image. For example, the second row shown in FIG. 11 indicates that "pc01-s.bmp" and "menu01.bmp", which are panel images, are generated based on "pc01.jpg" and "menu01.html", respectively. The second row shown in FIG. 11 also indicates that the data written in the field for the first storage area is a panel image pertaining to the link target, and the data written in the field for the second storage area is a panel image pertaining to the link source.

(3) In the above embodiment, when the user clicks on a part of the page image currently displayed on the touchscreen 15 where a hyperlink is embedded, the page image currently displayed on the touchscreen 15 is switched to a link target page, and a page image of the link target page is stored into the first storage area.

However, there is a case where hypertext of a webpage does not have a hyperlink tag but merely has an image tag embedded therein. In such a case, image data corresponding to the image tag (e.g., image data of a personal computer) is transmitted along with the hypertext. When a page image of this webpage is displayed on a normal web browser, nothing happens to the behavior etc. of the web browser even if the user clicks on a part of the page image at which the image of the personal computer is displayed.

The present modification example introduces the following technique. When a web browser detects, during display of the above page image, that the user has clicked on the part of the page image which corresponds to the image tag and at which the image of the personal computer is displayed, the web browser performs processing that is similar to the processing performed when the user clicks on an image in which a hyperlink is embedded. In other words, when the user clicks on the above image of the personal computer, the web browser first overwrites the data stored in the second storage area with the data stored in the first storage area, and then stores data of the image currently displayed into the first storage area. The web browser also replaces the page image previously displayed with an enlarged image of the personal computer. When a print instruction is issued at this state, the web browser prints the image of the data stored in the first storage area and the image of the data stored in the second storage area on the same sheet, as with the case of the above embodiment. Even when a hyperlink is not embedded in a webpage, the above-described technique makes it possible to print a page image and an enlarged image of a part of the page image (e.g., the image of the personal computer) on the same sheet.

(4) In the above embodiment, when a link target of a hyperlink is image data, two images are printed on one piece of sheet. However, the present invention is not limited to this. A link target/source website is not limited to being image data, but may be a text document or the like.

For example, in a case where a page image of a link source shows a price list of products and a page image of a link target shows the detailed description of one of the products, the price list and the detailed description of said one of the products may be printed on the same sheet.

It has been described in the above embodiment that a bitmap image of a part of the price list that is currently displayed on the touchscreen 15 is stored into the first storage area. However, the present invention is not limited to this. Alternatively, a bitmap image including a part of the price list that does not fit in the touchscreen 15 (e.g., the entire price list) may be stored into the first storage area. In this case, when the user clicks on a hyperlink, an image of the entire price list and a page showing the description of the PC, may be printed out on the same sheet.

This way, the size of the image to be printed on the sheet does not have to be restricted by the size of the display area of the touchscreen 15.

(5) By way of example, the above embodiment has described a case where the information processing device is an MFP. However, the information processing device is not limited to being the MFP, but may be a personal computer or the like. Also, the print processing function described in the above embodiment may be installed in a web browser of the personal computer. In this case, the print processing unit 16 functions as a printer device and therefore has a different structure from the information processing device.

(6) By way of example, the above embodiment has described a case where a plurality of images are printed on one piece of sheet in such a manner that they are vertically arranged on the sheet. Alternatively, these images may be printed with a different layout; for example, they may arranged side by side, diagonally, etc. on the sheet.

For instance, when printing the images on a horizontally long sheet, arranging the images side by side on the sheet could leave smaller margins on the sheet. If that is the case, the flash memory 14 may prestore therein layout information showing how the images should be arranged and printed on the sheet in a 2-in-1 style. In this case, the images are printed in the 2-in-1 style based on the layout information.

For example, the layout information defines, for each print setting (the sheet size, the direction (crosswise or lengthwise) in which the sheet is set, etc.) the number of images to be arranged/printed on one piece of sheet, positions in which the images should be arranged on the sheet, the print sizes of the arranged images, etc.

The printing is not limited to being performed in the 2-in-1 style. A plurality of images may be printed on the same sheet.

In this case, the plurality of images may be printed on the same sheet by tracking back the link sources (i.e., a link source image, a link target image, an image of a link source of that link source image, etc.). Here, a database showing the associations between three or more images may be generated and stored in the flash memory 14 in advance. This way, the three or more images can be printed on the same sheet by simply referring to the database upon performing the printing.

(7) By way of example, the above embodiment has described a case where the panel image currently displayed is reduced in size when two images cannot fit in the printable area of the sheet. However, the present invention is not limited to this. Alternatively, the link source image may be reduced in size, or both of the link source image and the panel image currently displayed may be reduced in size. When both of the link source image and the panel image currently displayed are reduced in size, the scale of the reduction may be adjusted so that a sum of the areas taken up by these images on the sheet is equal to a maximum printable area.

(8) The present invention may be the above-described methods, a computer program that realizes the above-described methods on a computer, or a digital signal composed of the computer program.

(9) The present invention may be implemented based on any combination of the above embodiment and modification examples.

(10) The above embodiment and modification examples show aspects for solving the problems discussed in the above "BACKGROUND OF THE INVENTION" section. The above embodiment and modification examples are summarized as follows.

One aspect of the present invention is an information processing device that acquires via a network a first webpage in which a plurality of links are embedded, generates from the acquired first webpage a panel image to be displayed on a display panel, and displays the generated panel image on the display panel, the information processing device comprising: a selection receiver operable to receive, from a user, a selection of one of the links embedded in the first webpage whose panel image is being displayed; an acquirer operable, when the selection has been received, to (i) navigate from the first webpage to a second webpage corresponding to the one of the links, and (ii) acquire a link target image corresponding to the second webpage; a print instruction receiver operable to receive a print instruction from the user; and a print controller operable, when the print instruction has been received, to (i) generate a print image in which both the panel image and the link target image are arranged, and (ii) perform control to print the generated print image.

With the above structure, the information processing device of the present invention allows a user to obtain a single-sheet printout of (i) an image currently displayed and (ii) a page image that was displayed immediately before navigating to the image currently displayed, simply by issuing a print instruction with respect to the image currently displayed. This way, the user can easily grasp that the both images are associated with each other just by looking at the printout. The above structure also eliminates the burden of organizing separate printouts.

The information processing device may be structured such that (i) the print controller includes a storage, (ii) before acquiring the link target image, the acquirer causes the storage to store therein the panel image, and (iii) in generating the print image, the print controller reads out the panel image stored in the storage and arranges the read panel image in the print image.

With the above structure, a buffer for storing a page image of a link source should be the only memory area that is additionally provided to print the both images on the same sheet.

The information processing device may be structured such that (i) the storage includes a first storage area and a second storage area, (ii) the acquirer causes the first storage area and the second storage area to store therein the link target image and the panel image, respectively, and generates and holds a database that shows the link target image and the panel image in correspondence with each other, and (iii) in generating the print image, the print controller arranges the link target image and the panel image, which are respectively stored in the first storage area and the second storage area, in the print image based on the database.

The above structure makes it possible to (i) specify two images that are associated with each other and have been displayed before, based on the association between these two images stored in the database, and (ii) print these two images on the same sheet.

The information processing device may be structured such that the acquirer causes the storage to store therein, as the panel image, a part extracted from the first webpage to be displayed on the display panel.

With the above structure, the information processing device can (i) extract, from an image in which the links are arranged based on the first webpage, a partial image having the same size as a display area of the display panel, and (ii) cause the storage to store data of the extracted partial image. Accordingly, the above structure can reduce the size of necessary storage capacity.

The information processing device may be structured such that (i) the print controller prestores therein layout information showing positions where the panel image and the link target image should be respectively arranged on a sheet when printed, and (ii) the panel image and the link target image are arranged in the print image in accordance with the positions shown by the layout information.

The above structure makes it possible to determine, for each print condition (the sheet size, the printing direction, etc.), the aforementioned positions as layout information (i.e., the size, direction and position in which each image should be printed and which suit the print condition) in advance. When a plurality of images are printed on the same sheet according to the layout information, the printing result suits the print conditions.

The information processing device may be structured such that (i) the links embedded in the first webpage are specified by image tags, and (ii) the selection receiver receives, as the selection, a click operation on a part of the panel image that is associated with a corresponding one of the image tags.

When the first webpage includes an image that is not hyperlinked but is merely arranged in the first webpage with use of an image tag, if the user clicks on this image, then the information processing device having the above structure can navigate from a page image of the first webpage to the image of the image tag, as if the image of the image tag is hyperlinked. Even when a plurality of images cannot be printed on the same sheet due to the condition that is out of the user's control (e.g., whether the image in the first webpage is hyperlinked), the above structure allows printing the page image of the first webpage and the image of the image tag on the same sheet.

The information processing device may be a multifunction peripheral (MFP) comprising a printer, wherein the control performed by the print controller is to cause the printer to print the print image.

The above structure allows operating a plurality of functions, including those of the printer, in a coordinated manner.

Another aspect of the present invention is a recording medium having recorded thereon an information processing program executable on a computer used for an information processing device that acquires via a network a first webpage in which a plurality of links are embedded, generates from the acquired first webpage a panel image to be displayed on a display panel, and displays the generated panel image on the display panel, the information processing program comprising the steps of: receiving, from a user, a selection of one of the links embedded in the first webpage that is being displayed; when the selection has been received, (i) navigating from the first webpage to a second webpage corresponding to the one of the links, and (ii) acquiring a link target image corresponding to the second webpage; receiving a print instruction from the user; and when the print instruction has been received, (i) generating a print image in which both the panel image and the link target image are arranged, and (ii) performing control to print the generated print image.

With the above structure, the user can obtain a single-sheet printout of (i) an image currently displayed and (ii) a page image that was displayed immediately before navigating to the image currently displayed, simply by issuing a print instruction with respect to the image currently displayed. This way, the user can easily grasp that the both images are associated with each other just by looking at the printout. The above structure also eliminates the burden of organizing papers, which is caused by printing the images on separate papers.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An information processing device that acquires via a network a first webpage in which a plurality of links are embedded, generates from the acquired first webpage a panel image to be displayed on a display panel, and displays the generated panel image on the display panel, the information processing device comprising:
a selection receiver operable to receive, from a user, a selection of one of the links embedded in the first webpage whose panel image is being displayed;
an acquirer operable, when the selection has been received, to (i) navigate from the first webpage to a second webpage corresponding to the one of the links, and (ii) acquire a link target image corresponding to the second webpage;
a print instruction receiver operable to receive a print instruction from the user; and
a print controller operable, when the print instruction has been received, to (i) generate a print image in which both the panel image and the link target image are arranged, and (ii) perform control to print the generated print image.

2. The information processing device of claim 1, wherein the print controller includes a storage,
before acquiring the link target image, the acquirer causes the storage to store therein the panel image, and
in generating the print image, the print controller reads out the panel image stored in the storage and arranges the read panel image in the print image.

3. The information processing device of claim 2, wherein the storage includes a first storage area and a second storage area,
the acquirer causes the first storage area and the second storage area to store therein the link target image and the panel image, respectively, and generates and holds a database that shows the link target image and the panel image in correspondence with each other, and
in generating the print image, the print controller arranges the link target image and the panel image, which are respectively stored in the first storage area and the second storage area, in the print image based on the database.

4. The information processing device of claim 2, wherein the acquirer causes the storage to store therein, as the panel image, a part extracted from the first webpage to be displayed on the display panel.

5. The information processing device of claim 1, wherein the print controller prestores therein layout information showing positions where the panel image and the link target image should be respectively arranged on a sheet when printed, and
the panel image and the link target image are arranged in the print image in accordance with the positions shown by the layout information.

6. The information processing device of claim 1, wherein the links embedded in the first webpage are specified by image tags, and
the selection receiver receives, as the selection, a click operation on a part of the panel image that is associated with a corresponding one of the image tags.

7. The information processing device of claim 1 being a multifunction peripheral (MFP) comprising a printer, wherein
the control performed by the print controller is to cause the printer to print the print image.

8. A non-transitory computer readable recording medium having recorded thereon an information processing program executable on a computer used for an information processing device that acquires via a network a first webpage in which a plurality of links are embedded, generates from the acquired first webpage a panel image to be displayed on a display panel, and displays the generated panel image on the display panel, the information processing program comprising the steps of:
receiving, from a user, a selection of one of the links embedded in the first webpage that is being displayed;
when the selection has been received, (i) navigating from the first webpage to a second webpage corresponding to the one of the links, and (ii) acquiring a link target image corresponding to the second webpage;
receiving a print instruction from the user; and
when the print instruction has been received, (i) generating a print image in which both the panel image and the link target image are arranged, and (ii) performing control to print the generated print image.

* * * * *